Dec. 26, 1939.  R. R. CLARK  2,184,280
CLOSURE ASSEMBLY APPARATUS
Filed April 3, 1936  9 Sheets-Sheet 2

*Fig. 2*

Dec. 26, 1939.    R. R. CLARK    2,184,280
CLOSURE ASSEMBLY APPARATUS
Filed April 3, 1936    9 Sheets-Sheet 3

Dec. 26, 1939.     R. R. CLARK     2,184,280
CLOSURE ASSEMBLY APPARATUS
Filed April 3, 1936     9 Sheets-Sheet 5

Inventor
Ralph R. Clark
by
Walter J. Kaufman
Attorney

Dec. 26, 1939.   R. R. CLARK   2,184,280
CLOSURE ASSEMBLY APPARATUS
Filed April 3, 1936   9 Sheets-Sheet 6

Dec. 26, 1939.  R. R. CLARK  2,184,280
CLOSURE ASSEMBLY APPARATUS
Filed April 3, 1936  9 Sheets-Sheet 8

Patented Dec. 26, 1939

2,184,280

UNITED STATES PATENT OFFICE 2,184,280

CLOSURE ASSEMBLY APPARATUS

Ralph R. Clark, Lancaster, Pa., assignor to Armstrong Cork Company, Lancaster, Pa., a corporation of Pennsylvania Application April 3, 1936, Serial No. 72,489

27 Claims. (Cl. 219—13)

This invention relates generally to a closure assembly machine and more particularly to an assembly machine embodying means for generating heat, by electrical energy, within a closure shell or other conducting portion of a closure to effectuate activation of an adhesive utilized in the assembly, said heat being inductively produced in the conducting member.

The machine is particularly adapted for the assembly of sealing liners in crown closures, but is equally well suited for the assembly of sealing liners in screw threaded or other types of closures wherein the assembly is effected by means of an adhesive which is heat activatable. The mechanism is particularly advantageous for use in the assembly of liners to metal shells which are coated or decorated, as by lithographing, with a composition which may be deleteriously affected by heat above a limited temperature, since by the use of my machine the temperature at the decorated surface is controllable.

The device of my invention provides for heating of a conducting portion of the closure, which may be the shell proper, a thin metal disk or other conducting element, by electric inductive action, preferably effected while the closure shell is at rest upon a support. Provision is made for the application of cooling fluid to the decorated or other surface which it is not desired to heat. My device provides means for assembling the component elements under pressure prior to activation of the adhesive, thus assuring a bond over substantially the entire surfaces to be adhesively united.

The machine is designed for high speed operation and, in the preferred embodiment, is provided with a shell feeding mechanism adapted to convey shells directly form the shell forming machine, thus obviating the use of a shell feeding hopper and eliminating one of the major sources of "skinned decorations". The machine is so constructed and arranged that it occupies a minimum of floor space and, at the same time, provides adequate capacity for cooling of the heated element, if the adhesive used in assembly should require cooling.

If desired, the machine may be made "dual" and will thus provide a compact assembly unit requiring but a single driving mechanism. In the preferred embodiment, the assembly drum, or drums, if a dual machine be contemplated, is mounted for rotation in a vertical plane.

Other features of my invention include an arrangement of induction heating coils so positioned with respect to the assembly drums, pressure applying plungers and shell supports that heating may be effected while the members are in movement; a novel shell conveying and feeding mechanism; a device for selectively feeding liners to those stations where shells are or will be positioned for lining; a unique and commercially practicable driving system eliminating many moving parts and arranged for convenient speed control; means for effecting a constant load on the high frequency oscillator to obviate varying heating effects in the shells being operated upon; and other novel features and combinations more fully hereinafter set out.

In order that the invention may be clearly understood, it will be described in detail in conjunction with the attached drawings in which.

Figure 1:
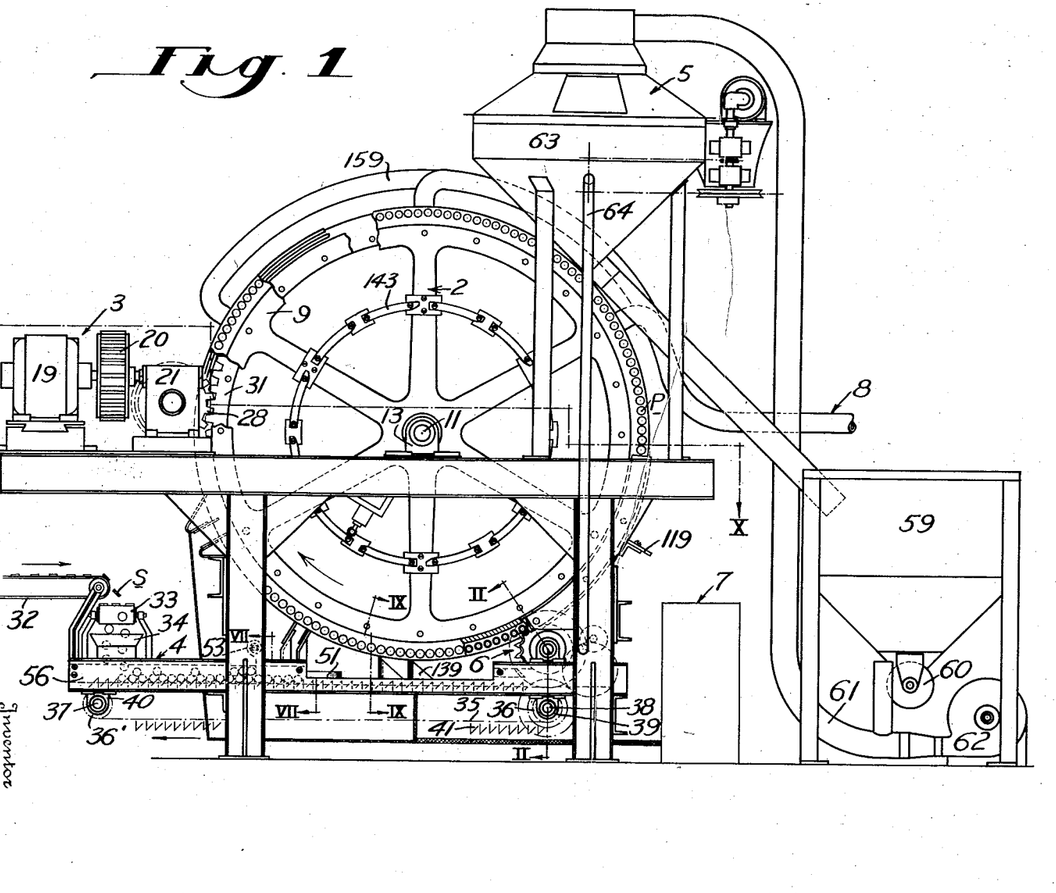
Figure 1 is a side elevation, partially broken away, showing a machine of the dual type adapted to assemble crown seals.

Referring first to Figure 1 which shows the general layout of a machine for assembling crown seals, the machine comprises essentially an assembly drum 2, which in the illustrated embodiment is made dual, a driving unit 3, a shell conveyor 4, a liner disk feeder and hopper 5, assembly drum feeding crown and liner disk star wheels and associated mechanism generally indicated by the numeral 6, an induction heating current supply system 7, and a cooling unit 8 (which may not always be required) associated with the disk hopper feed.

The assembly drums

Figures 10, 11:
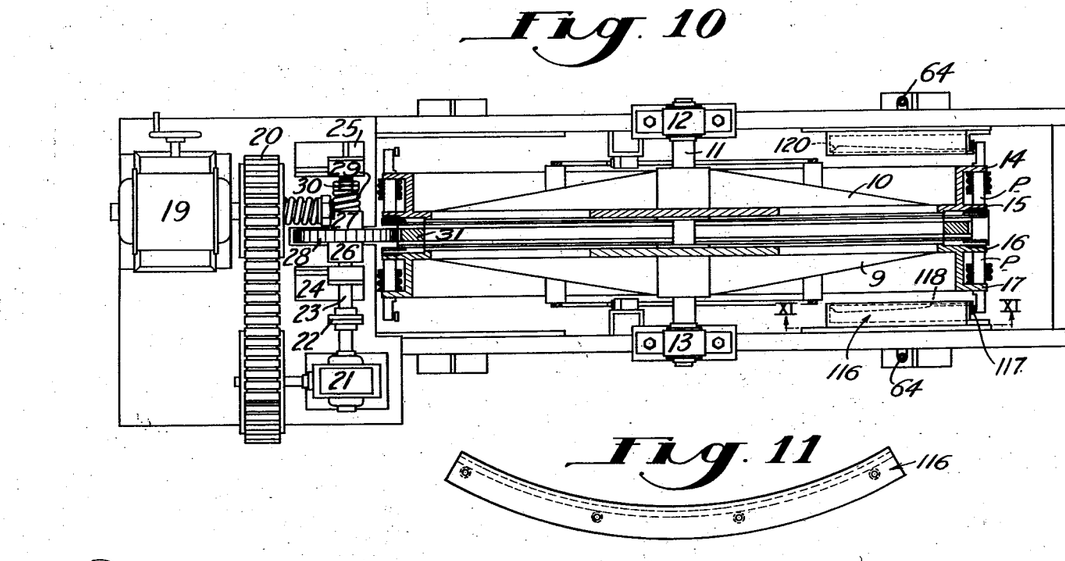
Figure 10 is a view partly in plan and partly in section on line X—X of Figure 1, showing the drive mechanism of my invention as well as the control cams for the pressure plungers.
Figures 11 and 12 are detail views, in elevation and top plan respectively, of the control cam.
Figure 12:
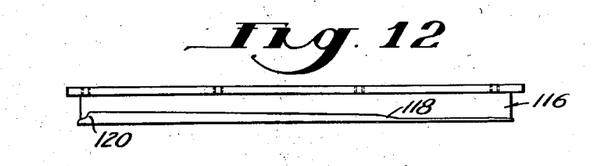

The assembly arrangement is best illustrated in Figures 1 and 10, and comprises a pair of drums 9 and 10 mounted on a shaft 11 for rotation in bearings 12 and 13. Each drum 9—10 includes a pair of integral plunger receiving flanges 14, 15, 16 and 17 through which are guided a plurality of spring urged pressure plungers P, which plungers serve to hold the component parts to be assembled in fixed relationship and under pressure as will be more fully hereinafter described.

The driving unit

Rotation is imparted to the drums 9 and 10 by means of a motor 19 through a change speed drive 20 of conventional form, a worm type angle drive 21 and a flexible coupling 22. A shaft 23 is affixed to the coupling 22 and passes through bearings 24 and 25. Intermediate these bearings, a friction clutch is provided in the form of disks 26 and 27 keyed to the shaft 23 and frictionally engaging a gear 28 revolvable on the shaft 23. A clutch pressure spring 29 and adjusting nuts 30 are provided to permit variation of the clutch driving force. The gear 28 meshes with a ring gear 31 lying intermediate the drums 9 and 10 and clamped therebetween.

The shell conveyor

Figure 7:
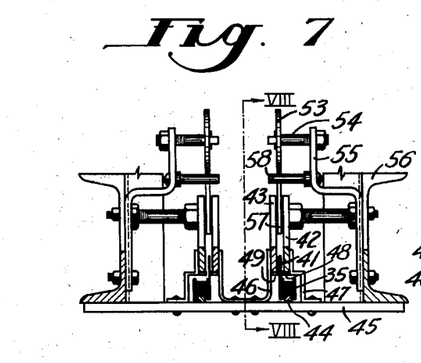
Figure 7 is an enlarged sectional view taken on the line VII—VII of Figure 1 and shows the shell conveyor.
Figure 8:
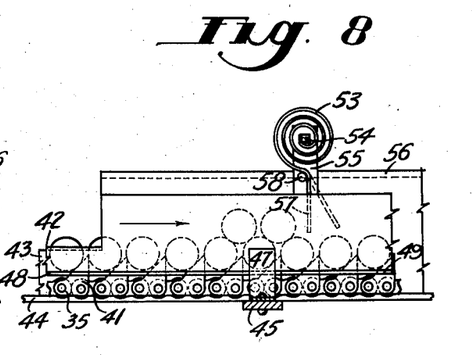
Figure 8 is a sectional view on the line VIII—VIII of Figure 7 and shows additional details of the conveyor mechanism.

The shell conveyor is shown generally in Figures 1, 2, 3, 4 and 9 and in more detail in Figures 7 and 8. The device illustrated in the drawings is designed primarily for operation upon crown closures in which the shell assumes the form of a relatively flat cap having a top and a flared, corrugated skirt or flange, and the shell feeding mechanism is constructed accordingly.

As hereinbefore pointed out, the common practice in the art has been to place the shells in a hopper provided with a suitable agitator and feed the shells from the hopper to the assembly machine. The corrugated skirt of the shell terminates in relatively sharp points and, consequently, any hoppering of the shells results in scratching of the decorative material applied to the shell.

According to the preferred embodiment of my invention, the shells are fed in single succession directly from the forming press where the shells are died and shaped from flat sheets of tin plate. These dies are usually of the multiple head type and may form twelve or more shells upon each stroke of the press.

In Figure 1 there is shown a belt conveyor 32 conveying shells S from a punch press (not shown) and a belt conveyor 33 for carrying the shells S to a chute 34 positioned to direct the shells into the shell conveyor. With an assembly machine mounted for rotation about a horizontal axis, it is desirable to feed the crown shells S in a vertical plane. My device feeds the shells in a vertical plane and in single succession and there is no relative movement between the conveyor and the shells and there is, therefore, no tendency to skin the decorations.

Referring to Figures 1, 7 and 8, each shell conveyor comprises a roller chain 35 adapted to move in a closed path about sprockets 36 and 36′ mounted on shafts 37 and 38 revolvable in bearings 39 and 40. Since the machine illustrated in the drawings is dual, a dual conveyor is employed, but, since the sections are similar, a single one only will be described. The chain 35 is provided with a plurality of members 41 defining pockets which convey the crown shells. Side guard plates 42 and 43 are provided forming a passage-way through which the members 41 travel. The walls defined by the plates 42 and 43 are positioned and proportioned to insure proper movement by the members 41. During movement of the members 41 through the passage-way, the chain 35 is guided upon a track 44 secured to a base 45 for the conveyor. The plates 42 and 43 are suitably supported over the chain by brackets 46 and 47 mounted upon the base 45, as best shown in Figure 7. Bottom plates 48 and 49 are secured to the plates 42 and 43. It will be noted that plate 49 is provided with a guiding rib 50 (Figures 9 and 14) extending longitudinally of the passage-way and serving to guide the edge of the skirt therealong.

Figure 14:
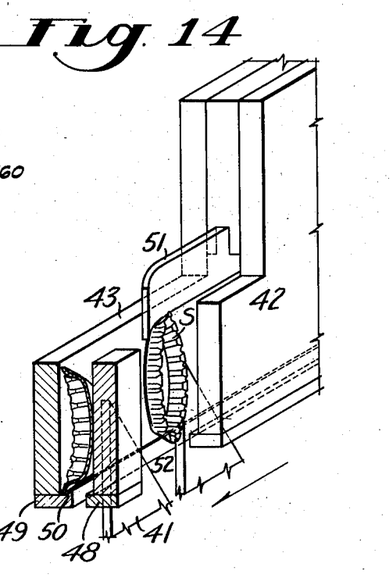
Figure 14 is an isometric view showing a crown shell selecting mechanism.
Figure 15:
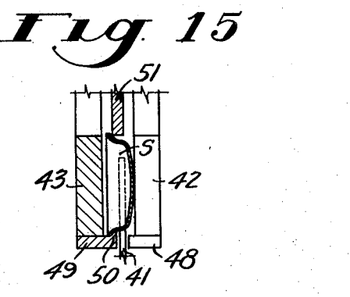
Figures 15 and 16 are sectional views illustrating the operation of the shell selector.
Figure 16:
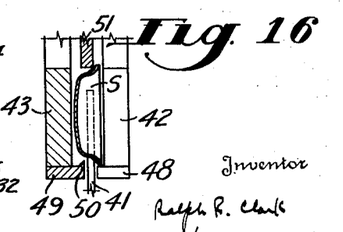

In order that the shells be properly positioned when entering the assembly drum, with the open end defined by the skirt facing the liner inserting device, a device is provided to remove those shells which are incorrectly positioned. This device is a guide finger 51 (as shown in Figures 14, 15 and 16) suitably positioned along the passage-way and adapted to eject those shells which are improperly positioned by causing them to drop through an opening 52 formed by cutting away a portion of the side plate 42 and the bottom plate 48. Those shells which are properly positioned with their flanges in engagement with the guiding rib 50 pass over the openings 52 with the flange of the shell in engagement with the rib 50 and with the guide finger 51, Figure 15, whereas those which are improperly positioned, as shown in Figure 16, will be urged outwardly through the opening 52 by the curved end of the guide finger 51.

When feeding directly from a press, it may sometimes happen that shells will become superimposed in the conveyor passage-way and in order to insure that they be fed in single succession to the assembly drum, a device is provided which is adapted to prevent superimposed shells from passing a predetermined point along the passage-way. In the embodiment shown in Figures 7 and 8, this device comprises a spiral spring 53 secured by a stud 54 to a bracket 55 attached to the main supporting channel 56 of the conveyor. The spring has a depending tongue 57 lying within the passage-way and positioned above the guide rib 50 a distance sufficient to pass a single shell, but insufficient to permit the passage of superimposed shells. In operation, the tongue is moved as shown in dotted lines in Figure 8, by the superimposed shell in its forward movement, compressing the spring until the pressure developed thereby is sufficient to dislodge the superimposed shell, whereupon, the spring action of the tongue snaps the shell rearwardly where it may fall into an empty pocket defined by a member 41; rearward movement of the tongue 57 being limited by a stop pin 58.

The chain conveyor is moved through a closed path by means of suitable gearing which will be described in conjunction with the assembly drum feeding star wheels with which the conveyor drive is associated. Any suitable drive mechanism may be utilized so long as it is synchronized with the star wheel feeding rate.

The liner disk delivery mechanism

The liners to be assembled with the shells are fed through a suitable stacker to the drum feeding star wheels. The feeder illustrated in Figure 1 is of the type disclosed in my copending application, Serial No. 2,993, filed January 29, 1935, (now Patent No. 2,108,163, granted February 15, 1938), entitled Centrifugal feeding device.

Briefly, this mechanism comprises a hopper 59 provided with a metering device 60 which feeds liners to a conduit 61 through which they are forced by an air blast created by a fan 62. The disks fed through the conduit enter a centrifuging device 63 which stacks the liners in a stacking tube 64 from whence they are delivered to the assembly drum feeding star wheels. I prefer to use a feeding device of the type disclosed in my copending application above referred to, since it is capable of feeding a relatively larger number of liners per minute than any heretofore used and thus does not limit the speed of assembly capable of attainment with my new mechanism.

The assembly drum feeding star wheels

Figure 2:
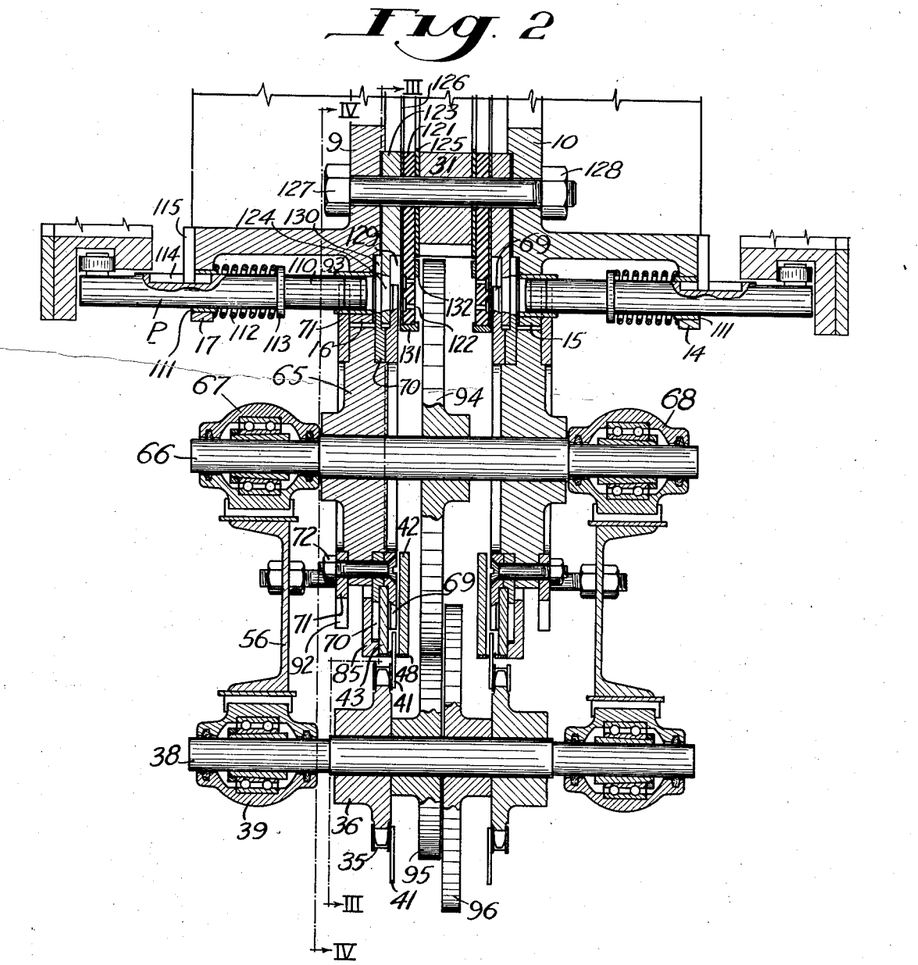
Figure 2 is an enlarged sectional view of the liner inserting and plunger mechanism taken on the line II—II of Figure 1.
Figure 3:
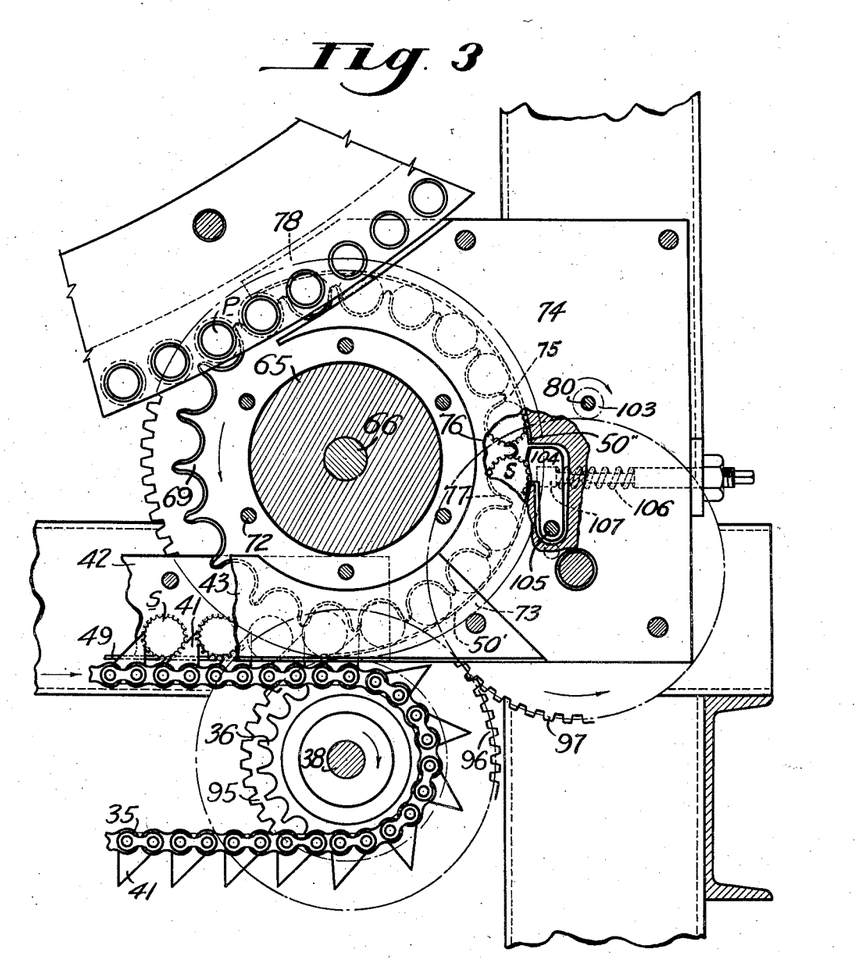
Figure 3 is an enlarged sectional view, partly broken away, illustrating selector mechanism for the liner feeding mechanism. This view is taken on the line III—III of Figure 2.

The assembly drum feeding star wheels are best illustrated in Figures 2 to 6. In a dual machine, such as that illustrated, each comprises a hub 65 mounted upon a shaft 66 for rotation in bearings 67 and 68 (Figure 2) suitably mounted upon the frame of the machine. The shell feeding star wheel 69, the liner feeding star wheel 70, and the driving star wheel 71 are bolted to the hub 65 by bolts 72 and are positioned coaxial with the shaft 66. The shell feeding star wheel 69 rotates between plates 42 and 43 defining the shell conveyor. As shown in Figure 3, shells S positioned in the pockets defined by the members 41 are brought into position to be engaged by the teeth of star wheel 69, being carried forward to a position adjacent the plungers P for assembly with liners. A continuation 50' of the guiding rib 50 is provided in a plate 73 (Figure 3) which is secured in position between guide plates 42 and 43. Plate 74 which lies in abutting relationship with guide plate 43 is provided with an extension 50'' of the guide rib 50'. Plate 74 is recessed at 75 (Figures 3 and 6) to provide a guide surface 76 which serves to keep in a vertical plane the shells held by the guiding surfaces of the teeth 77 provided on the teeth of the star wheel 69. It will be noted from an examination of Figure 3 that the plate 74 is cut away to provide a tongue 78 lying within the assembly drum and serving to guide the shells into proper position for engagement with the liners and pressure plungers P.

From the foregoing, it will be observed that shells S are conveyed from the forming press, through the conveyor 4; are picked up by the teeth 77 of the drum feeding star wheel 69, being held by the extensions of the guiding rib 50 throughout their travel and held vertical by the guide surface 76 of the plate 74; and are positioned by the star wheel 69 within the assembly drum for subsequent insertion of the sealing liners.

The sealing liners for assembly with the shells are fed by gravity through the stacker tube 64 and are fed to the liner feeding star wheel 70 by a rotating feeding finger 79 (Figures 4 and 5) mounted for rotation on a shaft 80 journalled in bearings 81 and 82 positioned in the plates 74 (on a dual machine) and having bearing caps 83 and 84. The stacker tube 64 terminates in a vertical plate 85 (Figure 5) which is recessed upon its lower surface as shown at 86 to permit rotation of the finger 79.

Figure 4:
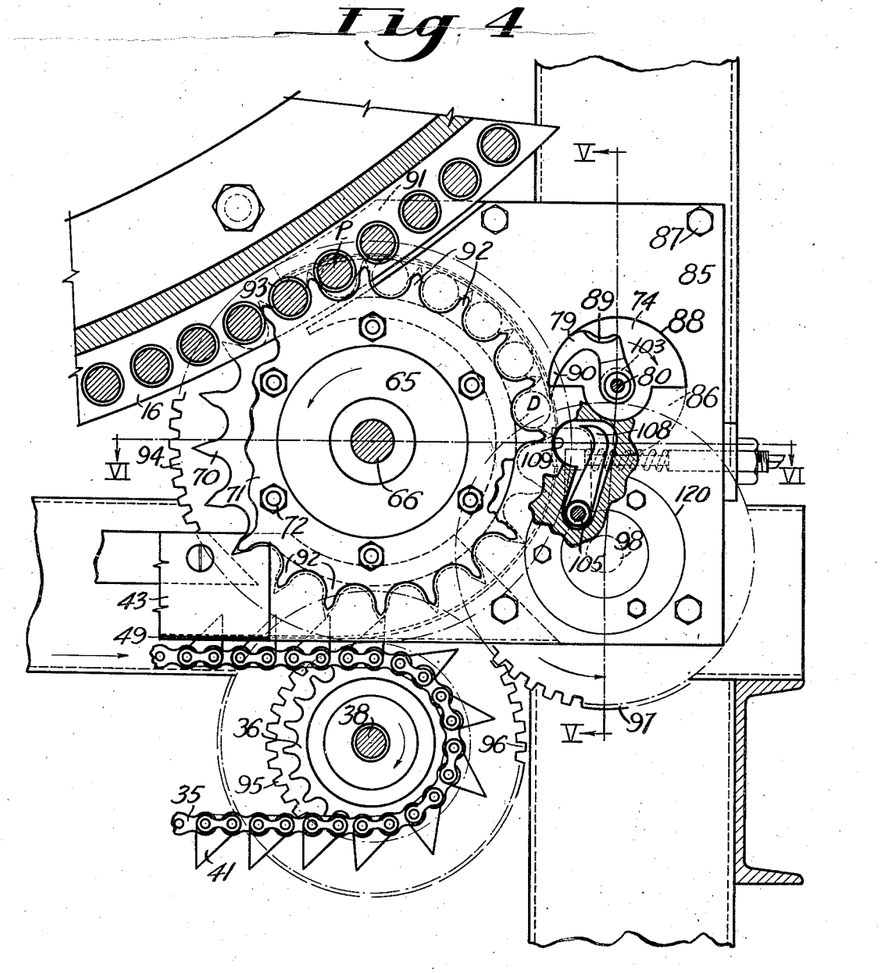
Figure 4 is a similar view, taken on the line IV—IV of Figure 2 and showing the liner feed mechanism and part of the selector.
Figure 18:
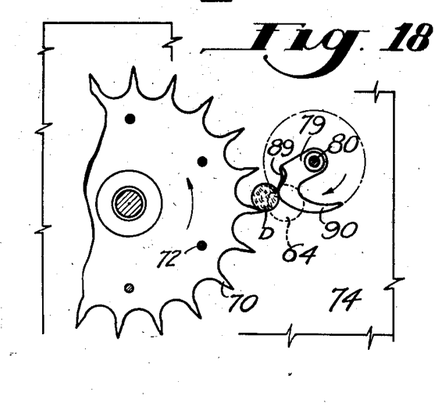
Figure 18 is a diagrammatic view showing the liner feeding mechanism for the liner feeding star wheel.

The disk feeder is shown in Figure 4 and in Figure 18 where overlying parts have been removed for the sake of clarity. The weight of the disks D in the stacker tube 64 urges the lowermost disk in the tube into engagement with the plate 74 to which plate 85 is bolted by bolts 87. Finger 79 operates in an opening 88 provided in plate 85 and in the recess 86 let into the rear surface of plate 85, with the flat surface of finger 79 lying in engagement with the surface of plate 74. Rotation of the finger 79 in the direction of the arrow (Figure 18) will cause arcuate portion 89 thereof to engage the disk lying in engagement with plate 74 urging it into the position shown in Figure 18. Upon engagement of the disk D with a tooth on the wheel 70, circular motion of the disk D about the axis of rotation of the finger will be arrested and the disk urged radially by the trailing edge 90 into the pocket formed by the teeth of the star wheel. The recess 86 provided in plate 85 extends under the stacker tube entrance and from there to the edge of the plate adjacent the star wheel 70 to provide a passage-way for the disks from the stacker tube to the liner disk feeding star wheel 70.

From an examination of Figure 18 it will be observed that from the time the trailing edge 90 of the finger 79 moves out of the path of the stacker tube 64 until the arcuate portion 89 reaches a position under the tube 64, or about three-quarters of a revolution of the finger 79, the lowermost disk is free to move onto the plate 74. This is highly desirable when it is required to rotate the finger 79 at a high rate of speed.

It will be evident from an examination of Figure 4 that the drum feeding star wheel 70 operates between plates 85 and 74 which form guiding surfaces for the disks D. A tongue 91 is provided on plate 85 and is similar to tongue 78 on plate 74 and serves to support the disks D as they enter the assembly drum.

The shell and liner feeding star wheels have the same number of teeth, are coaxial, and are positioned with the teeth in mutual alignment. This insures that the shell and liner carried by respective teeth will always be in axial alignment when positioned within the assembly drum. Figure 2 shows the star wheels in position within the drum but with the shells and liners removed for clarity of illustration.

Rotation is imparted to the star wheels, feeding finger and shell conveyor by means of driving star wheel 71 mounted upon hub 65. This driving star wheel is provided with a plurality of teeth 92 so spaced as to be engaged by the plunger bushings 93 (Figures 2 and 4), rotation of the associated mechanism is effected thereby, insuring synchronism with the assembly drum. The bushings 93 are positioned in the flanges 15 and 16 of the assembly drums and serve both as bushings for the plungers P and also as driving members for the driving star wheels. A gear 94 is keyed to shaft 66 of the star wheels and meshes with a gear 95 secured to shaft 38 to which sprocket 36 for the shell conveyor chain is also keyed. The ratio of gears 94 and 95 is so determined with respect to sprocket 36 that synchronism is effected between the rates of feed of the shell conveyor and of the shell feeding star wheel.

Figure 5:
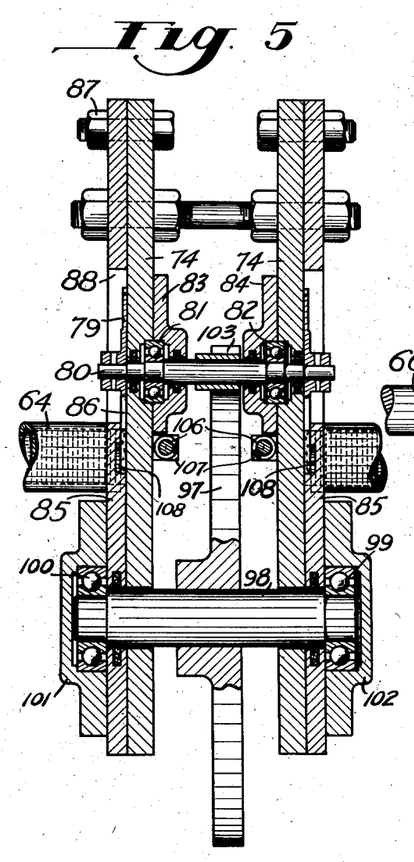
Figure 5 is an enlarged sectional view showing the disk feeding mechanism and taken on the line V—V of Figure 4.

Another gear 96 is keyed to shaft 38 (Figure 4) and meshes with a gear 97 mounted upon a shaft 98 journalled in bearings 99 and 100 secured to plates 85 by bearing caps 101 and 102 (Figure 5). This gear 97 meshes with a gear 103 secured to the feeding finger shaft 80. The gearing ratio is such as to rotate the feeding finger once for each pocket of the liner disk feeding star wheel presented to it.

According to my invention, rotation of the assembly drum imparts rotation to all of the auxiliary feeding and conveying mechanism.

The disk selector mechanism

Figure 6:
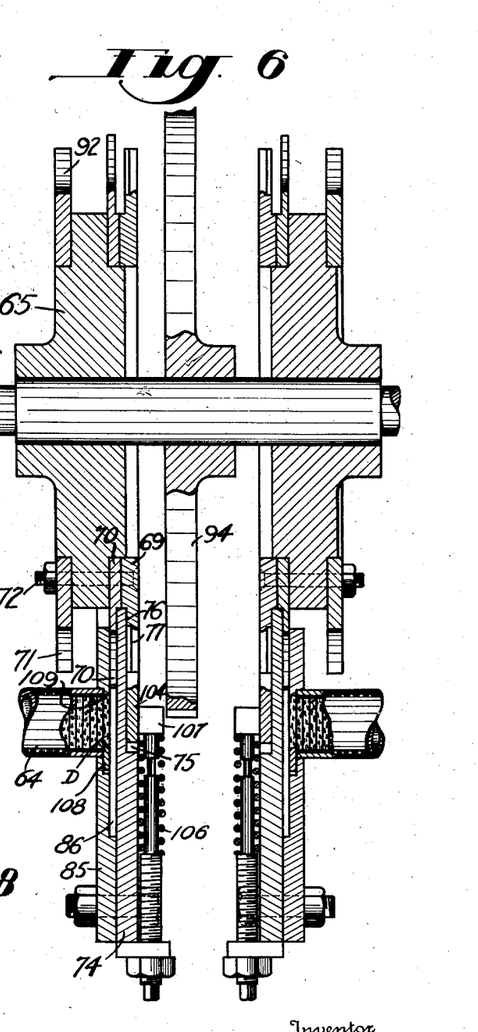
Figure 6 is an enlarged sectional view taken on the line VI—VI of Figure 4.

The disk selector mechanism is illustrated in Figures 3, 4, 5, and 6 and operates to prevent the feeding of a disk to a tooth of the liner disk feeding star wheel when no shell is positioned in a corresponding pocket in the shell feeding star wheel 69. The mechanism comprises a controller arm 104 positioned in recess 75 provided in plate 74; said arm 104 being pivoted at 105 and urged into the path of shells traveling along guide rib 50 by a spring 106 acting against a boss 107 on the arm 104 (Figure 6). Thus, arm 104 is normally urged into the path of travel of shells positioned in the star wheel 69.

It will be noted that arm 104 lies within the arc of rib 50'' until urged to the right, Figure 3, by the corrugated flange on the skirt of the shell S. Now referring to Figure 4, which shows plate 85 which overlies plate 74 into which arm 104 is recessed, a brake 108 is recessed into plate 85 adjacent the entrance of the stacker tube 64. Brake 108 is secured to shaft 105 and moves coincidentally therewith, and when arm 104 assumes the position shown in Figure 3, brake 108 will be in the position shown in Figure 6, and will engage the disk D in the stacker tube and will urge it against the surface 109 of the plate 85 until released by movement of the controller arm 104 effected by engagement of a shell S therewith. In the event no shell is present in a pocket of the star wheel 69, controller arm 104 will not release the brake 108. The disks D accordingly can not be fed until controller arm 104 is released by a shell coming into contact therewith. When brake 108 is applied, feeding finger 79 is free to rotate in recess 86, the disk being held by the brake 108 out of the path of the feeding finger. The positioning of the arm 104 is such that brake 108 will engage a disk in the stacker tube before it has an opportunity to move onto the plate 85 and be swept into the disk feeding star wheel by the feeding finger 79. Thus, by my invention it is possible to selectively feed liners to those pockets in the liner feeding star wheel axially aligned with a shell positioned in the shell feeding star wheel, and not to feed liners to those pockets aligned with pockets where no shell is present.

The plunger assembly and control

Figure 9:
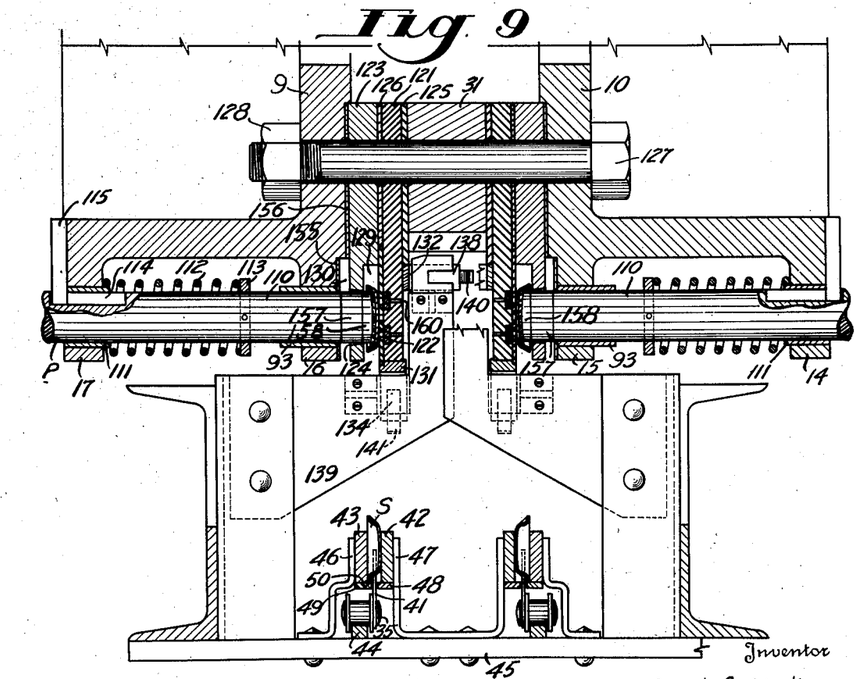
Figure 9 is an enlarged sectional view on the line IX—IX of Figure 1.
Figure 13:
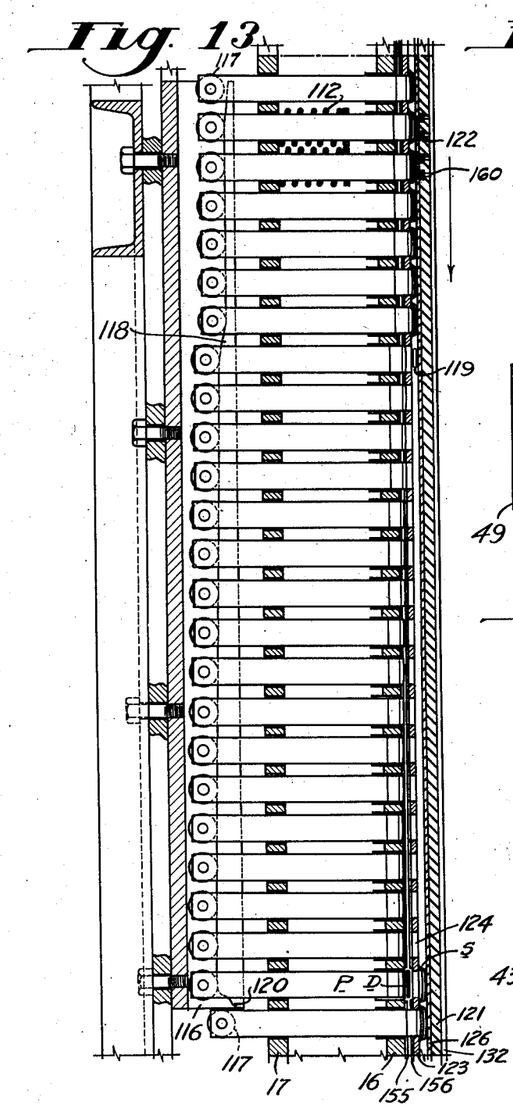
Figure 13 is a projected view illustrating the action of the pressure plungers and their control cam.

As hereinbefore described, the pressure plungers P pass through flanges 14—15 and 16—17 of the main drums 9 and 10, (Figures 10 and 13). The plunger assembly is best illustrated in Figures 2 and 9. Each plunger serves to move disk D, carried by the liner disk feeding star wheel, into position within a shell S, carried by the shell feeding star wheel, and to maintain the liner within the shell under pressure during activation of the adhesive employed in the assembly of such closures.

Each plunger P comprises a body portion 110 slidable horizontally in flanges 14—15 and 16—17. Flanges 15 and 16 are provided with bushings 93 above referred to, which are engaged by the driving star wheel 71, and flanges 14 and 17 are provided with bushings 111. Each plunger P is normally urged into operative position as shown in Figure 9 by a pressure spring 112 encircling plunger 110 and acting between the flange 14 (or 17) and a collar 113 pinned to the plunger 110. In order to prevent rotation of the plungers 110 during axial movement, each is provided with a keyway 114 in which operates a key 115 secured to the flange 14 (or 17). The force applied by each spring 112 between the shell and disk during heat activation of the joining medium is predetermined in accordance with the type of closure being assembled and the type of adhesive employed.

The operation of the plungers P is sequentially controlled to effect positioning of each disk D within its shell S at the precise moment when a disk and shell, in their respective star wheels, are in axial alignment with the plunger P, and to effect release of pressure upon activation of the adhesive employed and completion of the assembly operation. This control is effected by means of a cam 116 (Figures 10 to 13) which is secured to the frame of the machine and lies in the path of travel of cam rollers 117 mounted upon the plungers P. The arc of the cam 116 corresponds generally to the arc described by the rollers 117 in their travel. It will be noted by reference to Figure 13, which is a projected view, that each cam roller 117, during its travel in the direction of the arrow, engages the cam 116 and is actuated abruptly by the portion 118 of the cam. This releases the disks and shells from all pressure exerted by the springs 112 (most of the springs 112 have been eliminated in Figure 13 for sake of clarity) and moves the plungers P away from the assembled closures an amount sufficient to permit their removal from the assembly machine. Removal may be accomplished by means of a stationary finger 119 positioned in the path of travel of and engageable with the closures after release of such pressure. The cam 116 is so contoured at 120 that the plungers P are thrust rapidly by the springs 112 into engagement with the disks D urging them into engagement with their respective shells. The portion 120 is so positioned that this action is effected when the disk, shell and plunger are all in axial alignment. The plunger P hold the disks and shells under pressure during activation of the adhesive employed in assembly; such activation being effected during rotation. After completion of such activation, the crowns are removed as above described.

Induction heating mechanism and control

As hereinbefore pointed out, crown seals, which are the typical closures chosen for illustrative purposes, are generally assembled by positioning a sealing disk within a metallic shell to which it is applied, on the head portion thereof, at least, a heat activatable adhesive, such as adhesive lacquer; applying pressure between the shell and sealing disk; and thereafter applying heat to the shell to effect activation of the adhesive. Various other adhesives have been employed. Egg albumen, animal glue and rubber adhesives are examples.

I prefer to activate the adhesive by generating electrical heating current within the shell to elevate the temperature thereof to a degree sufficient to effect the required degree of heat for activation. This method is more particularly described and claimed in my copending application, Serial Number 33,205, filed July 26, 1935. The apparatus herein described is adapted to carrying out such method, particularly where adhesive lacquer or other dried, heat activatable adhesive is employed. Other types of heat activatable adhesive may be utilized in my machine, however, but may require mechanism for depositing the adhesive prior to assembly of the disks and shells for heat activation.

Referring now to Figures 1, 2, 9 and 17, which best illustrate the heating mechanism, a pair of annular disks 121, which are made of "Bakelite" or some other nonconductor of electrical current, provide a support for the closures during assembly and also house high frequency current inductor coils 122. These disks 121, together with linear guiding disks 123, having tapered linear positioning openings 124 to insure proper positioning of the disks in the shells; spacers 125 and 126 and ring gear 31, all of annular disk shape, are clamped between the drums 9 and 10 by bolts 127 passing through the various members and held by nuts 128. This entire mechanism rotates with the drums 9 and 10, being firmly clamped therebetween.

It will be noted by reference to Figure 9 that the closures are positioned between the support 121 and the liner guiding disk 123 which is recessed on its under side at 129 to permit passage of the shell feeding star wheel 69 therebetween. The flanges 15 and 16 of the drums 9 and 10 are similarly recessed at 130 to permit passage of the liner disk feeding star wheel 70.

Figure 17:
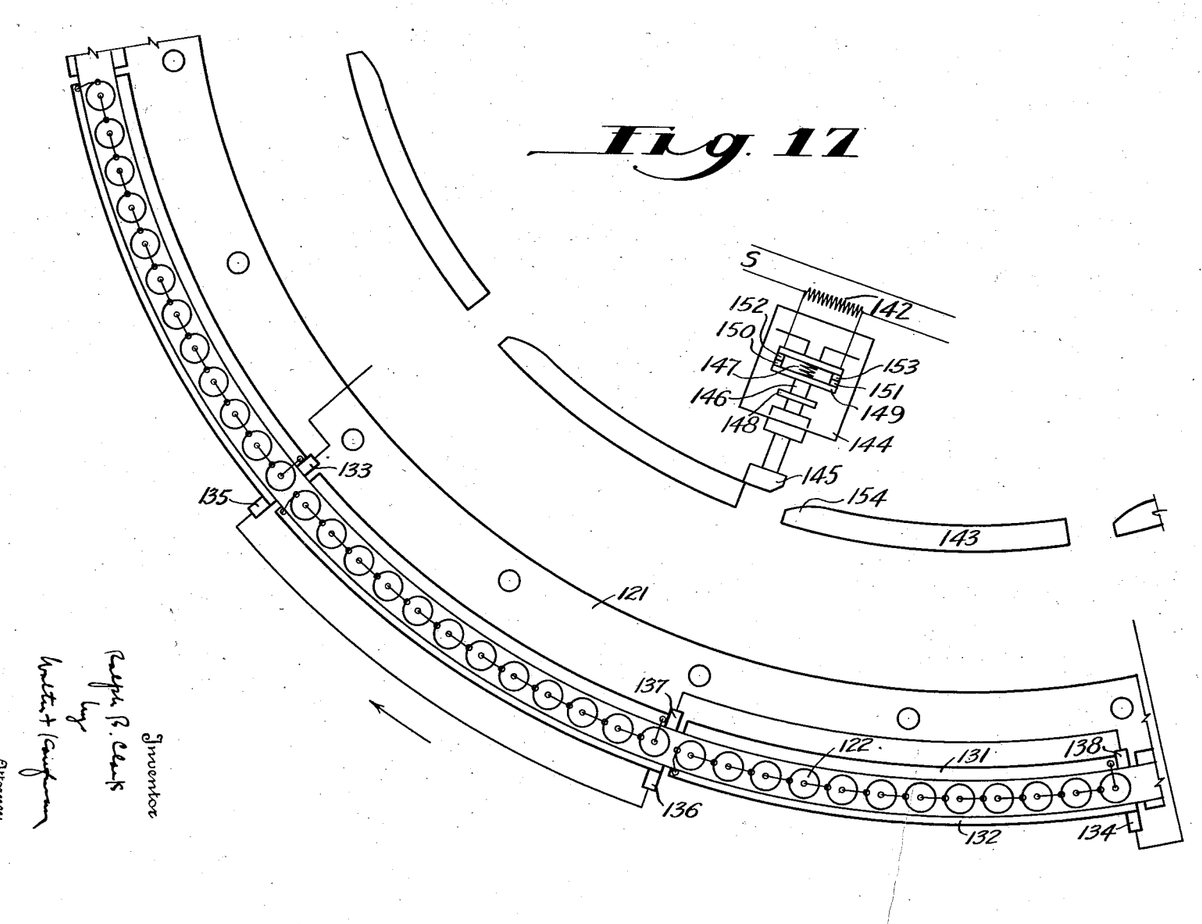
Figure 17 is a schematic view of the wiring layout for the heating coils, commutator bars, brushes, cut-out switch and auxiliary equipment.

An inductor coil which has been found eminently suited for generating high frequency electrical current within a skirted closure shell is described and claimed in the copending application of Emil R. Capita, Serial Number 33,336, filed July 26, 1935, and comprises a spiral conducting element having turns spaced for the passage of cooling air, and having a generally open center to avoid self-heating; the number of turns along any radius being substantially equal to produce an even field for the generation of an even heating effect in the element to be heated. By utilizing a coil of this type, it is possible to heat the top portion of a closure shell without materially elevating the temperature at the skirt portion. An inductor coil 122 is provided for each plunger on the machine and, in order to provide selective heating of the shells and subsequent cooling after activation, during rotation of the drums, a number of coils are connected in series and are selectively energized for a predetermined portion of a cycle of rotation of the drums and remain uncharged for another portion of the cycle to permit cooling, if necessary. In a machine having 144 plungers per drum, it has been found satisfactory to connect the coils in twelve series of twelve each. Each series is connected, as shown in Figure 17, to a segmental portion of commutator bars 131 and 132. These bars are secured to the disks 121; the bar 131 being positioned on the periphery thereof and the other bar 132 being secured to the face of the disk adjacent the gear 31. The spacer disks 125 compensate for the thickness of the bars 132.

Current for energizing the coils 122 is supplied from the high frequency generator unit 7 to the commutator bars 131 and 132 through brushes 133 and 134; the brushes being so spaced on the machine, as shown diagrammatically in Figure 17 that they supply energy to a predetermined number of segments, which in the illustrated embodiment is three. The intermediate segments and associated coils are connected by brushes 135, 136, 137 and 138 so that a total of 36 coils are always in series connection.

The source of high frequency current indicated generally at Figure 7 is preferably of a form illustrated in detail in the copending application of Emil R. Capita, Serial No. 33,337, filed July 26, 1935, although any other suitable circuit arrangement may be employed. The preferred type of oscillator comprises a high voltage, low frequency source coupled to quenched spark gaps which are included in a primary circuit tuned to the desired high frequency to be employed. The high frequency primary including the quenched spark gap is suitably coupled to the secondary circuit which includes the heating coils 122, and excites the same at a relatively low voltage with a correspondingly higher current flow at the high frequency, thereby effecting the necessary high frequency field about the heating coils 122 when connected by the energized brushes 133 and 134 through the commutator bars 131 and 132. It is preferred to use a bi-symmetric circuit having a theoretical zero median line at ground potential, minimizing the electrical stress by avoiding the imposition of full secondary potential differences between the energized coils and the grounded machine.

All of the brushes 133—138 are fixed to the machine and engage the commutator bars mounted upon the drums and supply energizing current thereto during rotation. Supports similar to the support 139 for the brushes 134 and 138, as shown in Figure 9, are provided for each set of brushes. Pressure springs 140, 141 are also provided to insure firm contact of the brushes with their commutator bars. The positioning of the brushes on the machine will depend upon the number of coils to be connected in series and under simultaneous energization; the positioning of the current supply brushes determining the length of the heating zone. The length may be conveniently varied to suit individual heating requirements and speed of operation. It will be noted, however, that the brush 134 and its support 139 (Figure 1) are spaced from the loading station (liner and shell feeding star wheels) a distance equivalent to 12 coils, or to a segment of the commutator bars. This is done in order that the elements to be heated be positioned adjacent their respective inductor coils prior to energization of any given group, and with such spacing, the loading of any given series of twelve stations is complete prior to energization of the corresponding series of coils, thus assuring that all of the elements in any series will be subjected to the high frequency field for the same period of time, and, since all of the coils which are spanned by the commutator bars positioned between brushes 133 and 134 are connected in series through the brushes 135, 136, 137 and 138, each coil of any series will be energized for the same period of time regardless of the position it assumes in the series.

Under actual production operating conditions, it has been found that there is some tendency for the high frequency current conducted by the brushes to arc from the brushes to oncoming segments of the commutator bars as they approach the brushes. This results in burning of the leading edges of the commutator bars of each section. In order to obviate this, mechanism is provided to diminish the supply of current to the primary of the high frequency oscillator; the diminution of current being sufficient to prevent the gaps in the oscillator from striking. It is preferred to diminish the current supplied, rather than to cut it off entirely, in order to maintain charging current in the low frequency high voltage transformer. Figure 17 illustrates a switch mechanism effective for placing a resistance 142 in one side of the current supply S to the primary of the high frequency oscillator 7. Cams 143 are secured to the drums 9 and 10 (Figure 1); there being one cam 143 for each pair of segments of the commutator bars 131 and 132. A double contact switch 144 is mounted upon the machine frame and is provided with a cam following shoe 145 secured to a plunger 146; the shoe 145 being normally urged into engagement with the cams 143 by a spring 147. A collar 148 is provided to limit movement of the plunger 146 urged by the spring 147. Plunger 146 carries a contact bar 149 provided with contacts 150 and 151 which are electrically connected. When the shoe 145 engages the cam 143 as shown in Figure 17 the brushes are in engagement with their respective commutator bar sections but are about to be engaged by oncoming commutator bar sections. Contacts 150 and 151 engage contacts 152 and 153 which shorts out the resistance 142. When the shoe 145 leaves the cam 143, contacts 150, 151 and 152 and 153 will be separated thus placing resistance 142 in circuit to diminish the current supply for the high frequency oscillator, and, since the cams 143 and commutator bars rotate in unison, the brushes will engage the oncoming segments substantially coincidentally with engagement of shoe 145 with its corresponding oncoming cam. Each cam 143 is provided with an elevating portion 154 adapted to move the contacts 150—153 into engagement.

In order to confine the high frequency field to the element to be heated, the liner positioning disks 123 (Figure 9) are preferably made of copper in order to obviate any dissipation of the high frequency current to the iron parts of the machine. Any other highly conductive, nonferrous material may be substituted for the copper liner positioning disks, such as brass, for example, which is somewhat more readily machined.

Copper shielding 155 and 156 is provided on the drums 9 and 10 to further protect against high frequency dissipation. Although the machine is at ground potential, the bisymmetric circuit of the above described Capita oscillator minimizes the hazard of arcing from the energized coils to the metal parts of the machine.

It is desirable to provide a fairly constant load on the secondary of the oscillator circuit in order that varying currents may not flow therein yielding varying heating effects and consequently defective closures. It is necessary, therefore, to insure that each station be properly loaded with a shell or other conducting member to be heated. This cannot always be effected since the shells may sometimes be impeded in their travel to the assembly drums and "misses" will result, thus changing the load of the secondary of the oscillator, and changing its resonant frequency. This may become somewhat aggravated if the impediment prevents a whole series of 12 or more stations to pass unloaded, for then the load will be decreased by one-third or more, depending upon the number of unoccupied stations. In my preferred embodiment, means are provided to insure that the load on the oscillator will be constant even though some stations be unoccupied by shells. This is effected by providing each plunger 110 with a non-conducting head portion 157 to which is spun a metallic thimble 158 of sheet metal corresponding generally in character to the metal of the shells S being operated upon, and when the supply of shells to any stations is impeded, the thimbles 158 use the high frequency energy dissipated by the coils 122; each thimble corresponding in load to a shell S and being insulated from the plungers 110 by the head 157. At those stations where a shell S is present, the thimbles 158 will be shielded from the high frequency field by the shell S and will be noneffective insofar as load is concerned.

*Shell cooling mechanism*

In my preferred embodiment, the drums are of sufficient size to permit of cooling after heat activation. This is desirable in the event thermoplastic adhesives are used which require setting under pressure to complete activation. In the embodiment above described where 12 series of coils are provided and three series are energized and with two series positioned between the unloading station and the first energized series, a space equivalent to seven series is provided for cooling purposes, or a cooling cycle under pressure equivalent to seven-twelfths of each revolution of the machine, and a heating cycle of one quarter of a revolution. Operating at a speed of six revolutions per minute (about 800 closures per minute per drum) the heating cycle will be equivalent to 2½ seconds and the cooling cycle about six seconds. If no cooling zone be required, the heating zone may be extended to cover additional sections and the speed of revolution increased or the completed elements may be removed at any position intermediate the end of the heating zone and the illustrated loading station.

In some instances it may be necessary to apply cooling fluid to the head portion of the closure shell during the generation of heat within the shell in order to prevent any rise in temperature of the coating composition applied to the outer shell which would deleteriously affect it, either by softening or discoloring it. It may also be necessary with certain types of adhesive to apply cooling fluid after heating has been effected—in order to complete the setting of a thermoplastic adhesive for example. As shown in Figure 1, an air blast type cooling system may be conveniently arranged for use with a dual drum machine by positioning air ducts 159 between the drums at the periphery thereof to direct air against the closure support and coil housings 121. Openings 160 are provided in the support 121 (Figure 9) communicating with the face of the support 121 upon which the closures rest and thus cooling fluid may be passed directly into engagement with the outer or decorated surface of the shell and rapid cooling may be effected. The ducts 159 may be interconnected with the conveyor fan 62 or to another suitable source of cooling fluid.

My machine is adapted for use with various types of adhesives, or liner materials. By generating heat within the body of the closure shell or other conducting portion of the closure, it is possible to operate at a relatively high speed since the electrical energy induced within the shell, or other conducting portion, rapidly elevates the temperature thereof. There is no heat dissipation except directly by the shell or other conducting portion, and, therefore, heating losses are not encountered as is the case where a gas flame is used. The use of my apparatus is, of course, not limited to the assembly of shells or liners by the use of interposed adhesive, but is eminently suited for other types of assembly. For example, it may be utilized in the assembly of metallic shells and unvulcanized rubber liners which are heated to semi-vulcanize the liner in situ and secure it to the closure shell, the latent adhesive properties of the rubber being availed of in this instance. It may also be used to set a flowed-in rubber liner or other plastic material which may either be set by gelling or by removal of solvent. In general, it may be used in connection with any adhesives carried by the shell, the liner, or interposed therebetween, fixed to a carrier therebetween, or forming a part of the liner, wherever the adhesive is developed or set by heat, the term "activated" being used to comprehend the change of physical or chemical state of the adhesive, rendering it effective for the purpose intended.

The method of securing elements together by means of an adhesive activated by subjecting one of the elements, susceptible to heating by induced electrical current, to a high frequency field until a temperature is reached within the element to activate the adhesive is described in more detail and claimed in my copending application Serial Number 33,205, entitled, "Method of making closures", filed July 26, 1935, of which this application is a continuation in part.

While I have illustrated and described certain specific preferred embodiments of my invention, it will be understood that the invention is not limited to the form shown and described but may be otherwise embodied and practiced within the scope of the following claims.

I claim:

1. In an assembly machine for assembling liners and closure shells by heat, a carrier movable in a closed path, means thereon for holding a closure shell with a liner therein in assembly position, and means operating to supply a high frequency electrical field embracing a closure shell held on said carrier to generate heat in said shell.

2. In an assembly machine for assembling liners and closure shells by heat, a carrier movable in a closed path, means thereon for holding a closure shell with a liner therein in assembly position, means operating to supply a high frequency electrical field embracing a closure shell held in said carrier to generate heat in said shell while at a portion of the path of the carrier, and means positioned at another portion of the path of the carrier for feeding closure shells to said carrier.

3. In an assembly machine for assembling liners and closure shells by heat, a carrier movable in a closed path, means thereon for holding a closure shell with a liner therein in assembly position, means operating to supply a high frequency electrical field embracing a closure shell held on said carrier with a liner therein to generate heat in said shell at a portion of the path of the carrier, means positioned at another portion of the path of the carrier for feeding closure shells and liners to said carrier, and means for removing assembled closures from the carrier.

4. A closure assembly machine in accordance with claim 3 characterized in that means are provided for feeding corresponding closure shells and liners simultaneously to the carrier.

5. In an assembly machine for assembling liners and closure shells by heat and pressure, a carrier movable in a closed path, pressure means thereon for holding a closure shell with a liner therein in assembly position, means operating to supply a high frequency electrical field embracing a closure shell held on said carrier to generate heat in said shell while at one portion only of the path of the carrier, and means positioned at another portion of the path of the carrier for feeding closure shells to said carrier.

6. In an assembly machine for assembling liners and closure shells by heat and pressure, a carrier movable in a closed path, pressure means thereon for holding a closure shell with a liner therein in assembly position, means operating to supply a high frequency electrical field embracing a closure shell held on said carrier to generate heat in said shell at a portion only of the path of the carrier, means positioned at another portion of the path of the carrier for feeding closure shells to said carrier, and control means rendering the pressure means operative while a closure operated upon thereby is embraced by the high frequency electrical field at one portion of the path of the carrier, and inoperative when the closure operated upon thereby is at another portion of the path of the carrier.

7. In an assembly machine for assembling closure shells and liners by heat and pressure, a carrier movable along a closed path, means for positioning a closure shell with a liner therein under pressure upon said carrier at one portion of the path of travel of said carrier, pressure means on said carrier for holding said shell and liner on said carrier by exerting pressure upon the liner, means further along said path of travel operating to supply a high frequency electrical field embracing said closure shell for electrically generating heat therein, control means further along the path of travel for rendering said pressure means inoperative, and means still further along said path of travel for removing assembled closures from said carrier.

8. In a machine for assembling closure shells and liners by heat activation of an adhesive, a carrier, means for moving the carrier in a closed path, means for positioning a closure shell with a liner therein upon said carrier, and an inductor coil positioned to generate a high frequency field embracing said closure shell while positioned on said carrier and in movement therewith during a portion only of the movement of the carrier, to heat said shell to activate said adhesive.

9. In a machine for assembling closure shells and liners by heat activation of an adhesive, the combination of a carrier divided into a plurality of stations, means for moving the carrier in a closed path, a plurality of pressure plungers at the stations, means for feeding closure shells and liners to said stations, control means for the plungers to effect sequential application of pressure to respective shells and liners as supplied to said stations and an inductor coil positioned to generate a high frequency field embracing a closure shell positioned on said carrier under pressure and in movement therewith.

10. In a machine for assembling closure shells and liners by heat activation of an adhesive, the combination of an assembly drum, means for feeding closure shells and liners to said drum, pressure plungers carried by the drum to hold the liners in the shells under pressure, an inductor coil positioned to generate a high frequency field embracing a closure shell on said carrier with a liner positioned therein under pressure to inductively heat said shell, and means for effecting such induction heating during a portion only of the travel of said shell upon said carrier.

11. In a machine for assembling closure shells and liners by inductively heating the shell to effect heat activation of an adhesive disposed between the shell and liner, the combination of means for generating high frequency heating currents within the shell and means for cooling a decorated surface of the shell during heating.

12. In a machine for assembling closure shells and liners by inductively heating the shell to effect heat activation of an adhesive disposed between the shell and liner, the combination of means for generating high frequency heating currents within the shell and means for directing cooling fluid against a decorated surface of the shell during heating.

13. In a machine for assembling closure shells and liners by inductively heating the shell to effect heat activation of an adhesive disposed between the shell and liner, the combination of a heating zone, means for moving closure shells through the heating zone and means for directing cooling fluid against a decorated portion of the shell during movement through the heating zone.

14. In a machine for assembling closures, the combination of a pair of axially spaced carriers rotatable in a closed path, said carriers having openings therein for the passage of cooling fluid therethrough, and means for directing cooling fluid between said carriers and through the openings therein.

15. In a closure assembly machine, an assembly drum having a plurality of pressure plungers mounted thereon, each adapted to move a liner disk into a shell, means for imparting rotation to said drum, a liner disk feeding wheel, a shell feeding wheel and a driving wheel coaxially mounted for coincidental rotation, members on said driving wheel engageable with members on said assembly drum to impart rotation to the wheels, and control means for said plungers adapted to sequentially actuate the same when a plunger, disk and shell are in axial alignment during rotation.

16. In a closure assembly machine, an assembly drum having a plurality of pressure plungers thereon, a shell support and a liner positioning member having openings therein in axial alignment with the plungers; means for imparting rotation to said drum; a liner disk feeding star wheel adapted to position liner disks sequentially over said openings in said positioning member, a shell feeding star wheel adapted to position shells sequentially on said support in alignment with said openings, said wheels being driven from the same shaft and each having the same number of member receiving openings in the periphery thereof, control means for the plungers to effect sequential movement of a disk into its corresponding shell through an opening in the liner positioning member when the plunger, disk and shell are in axial alignment.

17. In a closure assembly machine, a pair of assembly drums, a gear secured between and to said drums and means engageable with said gear to impart coincidental rotation to said drums.

18. In a closure assembly machine, a pair of assembly drums, a gear secured between and to said drums, means engageable with said gear to impart coincidental rotation to said drums, and means engageable with members on said drums to impart rotation to means for feeding closure shells and liners to said drums.

19. The combination with a closure assembly machine including an assembly drum rotatable in a closed path about a horizontal axis, of a shell conveyor rotatable in a closed path and adapted to convey closure shells in single series and in a vertical plane, and means for removing shells from said conveyor and placing them in said drum while maintaining them in a vertical plane.

20. The combination with a closure assembly machine including an assembly drum rotatable in a closed path about a horizontal axis, of a shell conveyor rotatable in a closed path and adapted to convey closure shells in single series and in a vertical plane, means for removing shells from said conveyor and placing them in said drum while maintaining them in a vertical plane, and means for driving the conveyor in synchronism with the drum.

21. In a closure assembly machine, a source of high frequency current, an inductor coil, a carrier for closure shells to be assembled, a metallic bodied pressure plunger for holding a liner within a shell on said carrier in inductive relationship with said coil, means on the plunger for absorbing high frequency energy from said coil in the absence of a shell, and insulation means disposed between the high frequency absorbing means and the body of the plunger.

22. In a closure assembly machine, an assembly drum having pressure plungers mounted thereon, said drum being made of ferrous metal, a closure shell support, inductor coils for generating high frequency current in closure shells on said support, and a shield of nonferrous metal disposed between the coils and the drum to obviate dissipation of high frequency current from said coils to said drum.

23. A pressure plunger for use in closure assembly machines utilizing high frequency current for induction heating, comprising a metallic body, an insulating tip therefor and a ferrous metal cover for said tip, said cover being insulated from the body portion of the plunger by said tip.

24. A pressure plunger for use in closure assembly machines utilizing high frequency current for induction heating, comprising a body member and a ferrous metal tip portion having a specific electrical resistance substantially equivalent to that of the closures to be inductively heated.

25. In a device for feeding closure liners including means for delivering liners to the feeding device and means for receiving liners fed by the feeding device, a receiving station to which liners are delivered by the delivering means, a feeding finger constituting the sole means for removing liners delivered to the receiving station, and means operating the feeding finger across the receiving station, the proportioning of the mechanism being such that the time during which the feeding finger obstructs the receiving station is substantially less than half the time of the cycle in which successive liners are fed to the receiving means.

26. A device for feeding closure liners comprising a receiving station, means for delivering liners to said station, a feeding member operating across the receiving station and moving liners from the receiving station and feeding them therefrom, said feeding member being so shaped that it obstructs the receiving station for a period of time substantially less than one-half of the time from when a liner is first engaged by the feeding member until the next liner is engaged thereby.

27. In a closure assembly machine, a shell carrying member, a closure liner carrying member, a receiving station for liners, means for feeding liners from the receiving station to the liner carrying member, means normally engaging a liner at a point removed from the receiving station to hold the same out of the receiving station, and means engageable with closure shells in the shell carrying member to release said liner engaging means.

RALPH R. CLARK.